(12) United States Patent
Kim et al.

(10) Patent No.: US 10,362,257 B2
(45) Date of Patent: Jul. 23, 2019

(54) COMMUNICATION INTERFACE DEVICE AND DISPLAY DEVICE

(71) Applicant: Samsung Electronics Co., Ltd., Suwon-si (KR)

(72) Inventors: Tae-hoon Kim, Suwon-si (KR); Je-hwan Seo, Daegu (KR); Seung-il Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 15/695,364

(22) Filed: Sep. 5, 2017

(65) Prior Publication Data

US 2018/0070042 A1 Mar. 8, 2018

(30) Foreign Application Priority Data

Sep. 5, 2016 (KR) ........................ 10-2016-0113875

(51) Int. Cl.
*H04N 5/44* (2011.01)
*H04N 5/63* (2006.01)
(Continued)

(52) U.S. Cl.
CPC ........... *H04N 5/4401* (2013.01); *G09G 5/006* (2013.01); *G09G 5/008* (2013.01); *H04N 5/20* (2013.01); *H04N 5/63* (2013.01); *G09G 2370/08* (2013.01); *G09G 2370/14* (2013.01); *G09G 2370/22* (2013.01)

(58) Field of Classification Search
CPC .............................. H04N 5/20; H04N 5/4401
USPC ....... 348/607, 608, 610, 622, 677, 705, 714, 348/716, 719, 725, 729, 730, 733, 743, 348/838, 523, 554, 567, 231.1, 158, 571, 348/572, 377, 376, 372, 333.13; 345/174, 345/594, 600, 699; 363/19, 20, 23, 80, 363/81, 89, 100, 126, 127, 129
See application file for complete search history.

(56) References Cited

U.S. PATENT DOCUMENTS 6,128,572 A * 10/2000 Suzuki ................... G01C 21/28
701/530
6,147,525 A * 11/2000 Mitani ............... H03K 5/00006
327/116
(Continued)

FOREIGN PATENT DOCUMENTS

JP 2009-55306 3/2009
JP 2009-239471 10/2009
(Continued)

OTHER PUBLICATIONS

International Search Report dated Nov. 30, 2017 in corresponding International Application No. PCT/KR2017/009031, 4 pages.
(Continued)

*Primary Examiner* — Paulos M Natnael
(74) *Attorney, Agent, or Firm* — Staas & Halsey LLP

(57) ABSTRACT

A communication interface device is disclosed. The communication interface device includes a plurality of terminals configured to receive a differential signal from an external device, a filter configured to include a low pass filter connected to at least one of the plurality of terminals, and a controller configured to determine whether a differential signal is input from the external device based on a change of an output value of the low pass filter.

15 Claims, 11 Drawing Sheets

(51) Int. Cl.
*H04N 5/20* (2006.01)
*G09G 5/00* (2006.01)

(56) References Cited

U.S. PATENT DOCUMENTS

| | | | | |
|---|---|---|---|---|
| 6,563,888 | B1* | 5/2003 | Toriyama | H04L 7/033 |
| | | | | 370/503 |
| 7,812,836 | B2 | 10/2010 | Koh | |
| 8,013,639 | B2 | 9/2011 | Aoike | |
| 2002/0039153 | A1 | 4/2002 | Yoo | |
| 2002/0041338 | A1* | 4/2002 | Shibutani | H04N 9/78 |
| | | | | 348/665 |
| 2002/0097175 | A1* | 7/2002 | Wong | H03M 3/50 |
| | | | | 341/144 |
| 2002/0114250 | A1* | 8/2002 | Fujimoto | G11B 7/1267 |
| | | | | 369/59.22 |
| 2003/0090579 | A1* | 5/2003 | Ohe | G02B 7/10 |
| | | | | 348/240.3 |
| 2003/0161640 | A1* | 8/2003 | Kimura | H03F 3/087 |
| | | | | 398/202 |
| 2005/0057222 | A1* | 3/2005 | Chen | H02J 7/0052 |
| | | | | 320/128 |
| 2005/0168600 | A1* | 8/2005 | Tanizoe | H04N 9/045 |
| | | | | 348/234 |
| 2007/0139521 | A1* | 6/2007 | Takahashi | H04N 5/23203 |
| | | | | 348/65 |
| 2007/0152994 | A1 | 7/2007 | Koh | |
| 2009/0190033 | A1* | 7/2009 | Asada | G09G 5/006 |
| | | | | 348/554 |
| 2009/0225108 | A1* | 9/2009 | Shen | H04N 5/44513 |
| | | | | 345/699 |
| 2009/0285275 | A1* | 11/2009 | Wong | H04B 7/005 |
| | | | | 375/229 |
| 2010/0302818 | A1* | 12/2010 | Chang | H02M 1/4225 |
| | | | | 363/80 |
| 2011/0109608 | A1* | 5/2011 | Kim | G06F 3/1431 |
| | | | | 345/211 |
| 2011/0134076 | A1* | 6/2011 | Kida | G06F 3/0412 |
| | | | | 345/174 |
| 2012/0242352 | A1* | 9/2012 | Gong | H03K 17/9525 |
| | | | | 324/656 |
| 2013/0187887 | A1* | 7/2013 | Mizuhashi | G06F 3/044 |
| | | | | 345/174 |
| 2013/0282373 | A1* | 10/2013 | Visser | G10L 21/0208 |
| | | | | 704/233 |
| 2013/0320875 | A1* | 12/2013 | Saes | H05B 33/0818 |
| | | | | 315/224 |
| 2014/0126587 | A1* | 5/2014 | Ichimura | H04L 25/0272 |
| | | | | 370/516 |
| 2016/0140075 | A1 | 5/2016 | Kashyap et al. | |
| 2018/0012552 | A1* | 1/2018 | Masui | G09G 3/3611 |

FOREIGN PATENT DOCUMENTS

| | | |
|---|---|---|
| KR | 10-2001-0081266 | 8/2001 |
| KR | 10-1111913 | 2/2012 |
| KR | 10-2015-0020111 | 2/2015 |

OTHER PUBLICATIONS

Written Opinion dated Nov. 30, 2017 in corresponding International Application No. PCT/KR2017/009031, 6 pages.

* cited by examiner

COMMUNICATION INTERFACE DEVICE AND DISPLAY DEVICE

CROSS-REFERENCE TO RELATED APPLICATIONS

This application claims priority from Korean Patent Application No. 10-2016-0113875, filed in the Korean Intellectual Property Office on Sep. 5, 2016, the disclosure of which is incorporated herein by reference in its entirety.

BACKGROUND

1. Field

Aspects of exemplary embodiments described herein relate to a communication interface device and a display device, and more specifically, to a communication interface device which can determine whether an image signal is input with a simple circuit and a display device.

2. Description of the Related Art

A display device is a device which processes and displays digital or analog video signals that are received from an external source or various video signals stored in an internal storage device as compressed files. In this case, the digital or analog video signals that are received from the external source may be broadcasting signals, digital satellite broadcasting signals, or signals that are transmitted from various kinds of external devices (e.g., a set-top box, a disk player, a mobile device, and a PC) or servers based on Internet protocols.

In order to save power, such a display device is in a power-saving state when a video signal is not input, and converts the input video signal into an operation state when a video signal is input, thereby displaying an image corresponding to the input video signal. For this operation, a circuit for determining whether a video signal is input through the input/output terminal is required.

There are cases that a recent display device uses a differential signaling to transmit an image signal. Herein, the differential signaling is the technology of pairing a single signal and a signal having a phase opposite to a phase of the signal and transmitting the pair.

Conventionally, a circuit for converting a differential signal to a single signal for determining an input of a differential signal transmitted as such a differential signaling and a circuit for determining whether an image signal is input based on the output signal of a single circuit are necessary.

Because a complicated circuit for detecting whether a differential signal is input is necessary, a method which can check an input of a differential signal with a simple circuit is demanded.

SUMMARY

Exemplary embodiments are related to a communication interface device which can determine whether an image signal is input with a simple circuit and a display device.

According to an aspect of an exemplary embodiment, a communication interface device includes: a plurality of terminals configured to receive a differential signal from an external device; a filter configured to include a low pass filter connected to at least one of the plurality of terminals; and a controller configured to determine whether a differential signal is input from the external device based on a change of an output value of the low pass filter.

The controller may convert the output value of the low pass filter to a digital value and determine whether a differential signal is input from the external device by comparing a pre-stored reference value and the digital value.

The device may further include: a switch configured to selectively connect the plurality of terminals to the low pass filter or a video processor, and the controller, in response to determining that a differential signal is input from the external device, may control the switch to connect the plurality of terminals to the video processor.

The filter may include: a first low pass filter configured to output a maximum voltage value of one of the plurality of terminals; and a second low pass filter configured to output a minimum voltage value of the terminal.

The controller may determine whether a differential signal is input from the external device by comparing an output value of the first low pass filter and an output value of the second low pass filter.

The first low pass filter may include: a first diode in which a cathode is connected to the terminal; a first resistance in which a first end is connected to an anode of the first diode and a second end is connected to a first input port of the controller; a second resistance in which a first end receives an input of pre-set voltage and a second end is commonly connected to the second end of the first resistance and the first input port; a first capacitor in which a first end is commonly connected to the second end of the first resistance, the second end of the second resistance and the first input port, and a second end is earthed; and a third resistance which is connected to the first capacitor in parallel, and the second low pass filter may include: a second diode in which an anode is connected to the terminal; a fourth resistance in which a first end is connected to the cathode of the first diode and a second end is connected to a second input port of the controller; a second capacitor in which a first end is commonly connected to the second end of the fourth resistance and to the second input port, and a second end is earthed; and a fifth resistance which is connected to the second capacitor in parallel.

The controller may change a value input to the first input port to a first digital value, change a value input to the second input port to a second digital value, subtract an offset value from the first digital value, add the offset value to the second digital value and determine whether a differential signal is input from the external device by comparing the first digital value and the second digital value to which the offset value is reflected.

The first low pass filter may include: a first diode in which a cathode is connected to the terminal; a first resistance in which a first end is connected to an anode of the first diode; a second resistance in which a first end receives an input of pre-set voltage and a second end is connected to a second end of the first resistance; a first capacitor in which a first end is commonly connected to the second end of the first resistance and the second end of the second resistance, and a second end is earthed; a third diode in which a cathode is commonly connected to the second end of the first resistance, the second end of the second resistance and the first end of the first capacitor, and an anode is connected to a first input port of the controller; and a third resistance in which a first end is commonly connected to the anode of the third diode and the first input port, and a second end is earthed, and the second low pass filter may include: a second diode in which the anode is connected to the terminal; a fourth resistance in which a first end is connected to a cathode of the second diode; a second capacitor in which a first end is connected to the second end of the fourth resistance, and a second end is earthed; a fifth resistance which is connected to the second capacitor in parallel; a fourth diode in which a cathode is commonly connected to the second end of the fourth resistance, the first end of the second capacitor and the first end of the fifth resistance, and an anode is connected to a second input port of the controller; and a sixth resistance in which a first end receives the pre-set voltage, and a second end is commonly connected to the anode of the fourth diode and the second input port.

The controller may change a value input to the first input port to a first digital value, change a value input to the second input port to a second digital value, and determine whether a differential signal is input from the external device by comparing the first digital value and the second digital value.

The low pass filter may be connected to any one of the two terminals to which a clock signal is input.

The plurality of terminals may be compatible with a High Definition Multimedia Interface (HDMI) connector.

According to an aspect of another exemplary embodiment, a display device includes: a communication interface configured to receive an image signal from an external device by using a differential signal; and a display configured to display an image corresponding to the received image signal, and the communication interface, based on a change of an output value of a low pass filter connected to at least one of a plurality of terminals which receive a differential signal, determines whether an image signal is input from the external device.

The display device may include a normal state in which an image is displayed and a power-saving state in which an image is not displayed, and the communication interface, in response to determining that an image signal is input from the external device in the power-saving state, may convert an operation state of the display device to the normal state.

The communication interface may include: a plurality of terminals configured to receive a differential signal from an external device; a filter configured to include a low pass filter connected to at least one of the plurality of terminals; and a controller configured to determine whether an image signal is input from the external device based on a change of an output value of the low pass filter.

The controller may convert the output value of the low pass filter to a digital value and determine whether a differential signal is input from the external device by comparing a pre-stored reference value and the digital value.

The communication interface may further include: a switch configured to selectively connect the plurality of terminals to the low pass filter or the display, and the controller, in response to determining that an image signal is input from the external device, may control the switch to connect the plurality of terminals to the display.

The filter may include: a first low pass filter configured to output a maximum voltage value of a terminal among the plurality of terminals; and a second low pass filter configured to output a minimum voltage value of the terminal.

The controller may determine whether an image signal is input from the external device by comparing an output value of the first low pass filter and an output value of the second low pass filter.

The low pass filter may be connected to any one of the two terminals to which a clock signal is input.

The plurality of terminals may be compatible with an HDMI connector.

DETAILED DESCRIPTION

Hereinafter, the various exemplary embodiments are described in detail with reference to the drawings attached hereto. The various exemplary embodiments may be modified in various forms and executed. To more clearly describe feature of the exemplary embodiments, matters which are well known to those skilled in the art are omitted.

Figure 1:
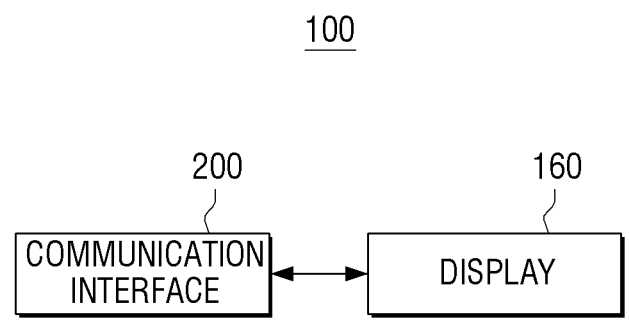
FIG. 1 is a block diagram illustrating a brief configuration of a display device according to an exemplary embodiment.

FIG. 1 is a block diagram illustrating a brief configuration of a display device according to an exemplary embodiment.

FIG. 1 illustrates that a display device 100 includes a communication interface 200 and a display 160.

The communication interface 200 may be connected with an external device such as a set-top box, a personal computer (PC), a notebook PC, a mobile device and the like, and may receive a video signal from the external device. Specifically, the communication interface 200 is formed to connect the display device 100 with the external device, and supports various connection methods in order to be connected with various external devices.

For example, the communication interface 200 may be connected through a universal serial bus (USB) or a wireless communication (that is, Wi-Fi 802.11a/b/g/n, NFC, Bluetooth) port in addition to being connected to a terminal device through a local area network (LAN) and the Internet network.

The communication interface 200 may receive an image signal in an HDMI method, a USB method and a Mobile High-Definition Link (MHL) method which is using a differential signaling. For this, the communication interface 200 may include housing which is compatible with a connector of a cable corresponding to the above methods. Herein, the differential signaling is technology pairing a single signal and a signal having a phase opposite to a phase of the signal and transmitting the pair. Hereinafter, a signal transmitted in the differential signaling method is referred to as a differential signal.

Herein, it is only described that only an image signal is received with a differential signal, but the communication interface 200 may transceive an audio signal, an image signal, contents and a control signal, etc. with an external device.

The communication interface 200 detects whether an image signal is input from the external device. Specifically, the communication interface 200 may determine whether an image signal is input from the external device based on a change in an output value of a low pass filter connected to a terminal which receives a differential signal. More specifically, if an output value of the low pass filter changes in the state that an image signal is not input, the communication interface 200 may determine that an image signal has been started to be input. On the other hand, if an output value of the low pass filter is maintained in the state that an image signal is not input, the communication interface 200 may determine that an image signal is not input.

Such a specified configuration and operation of the communication interface 200 will be described hereinafter with reference to FIG. 3.

The display 160 displays an image corresponding to a received image signal. The display 160 may be realized as a Liquid Crystal Display (LCD), a Light-Emitting Diode (LED), an Active Matrix Organic Light-Emitting Diode (AMOLED), a Cathode-ray tube (CRT), etc.

Figure 2:
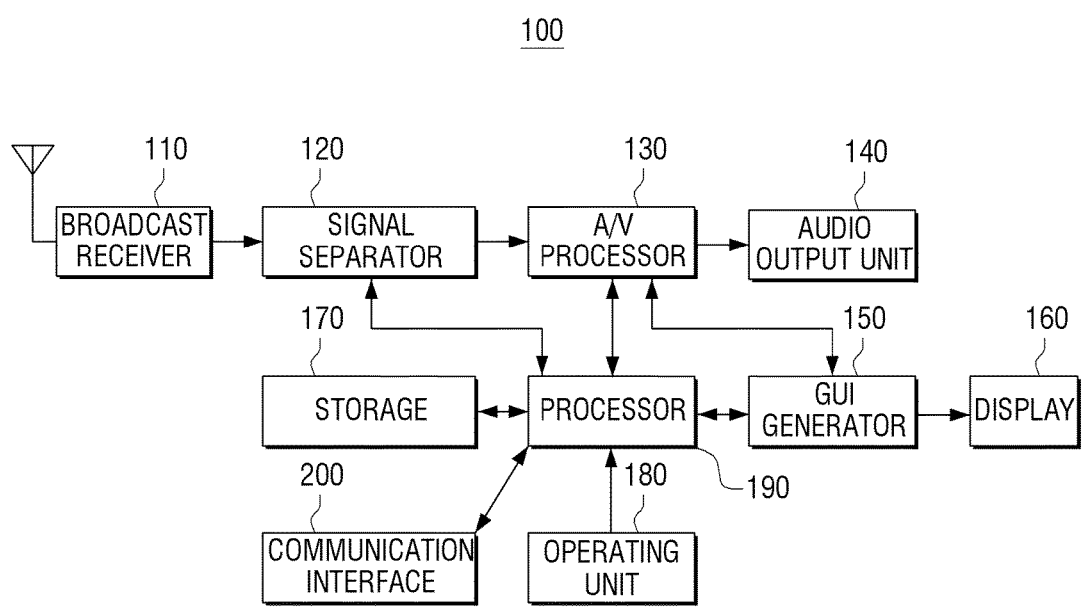
FIG. 2 is a block diagram illustrating a configuration of a display device in detail according to an exemplary embodiment.

Only brief configurations of the display device 100 are described, but the display device 100 may include a configuration illustrated in FIG. 2. With respect to a specific configuration of the display device 100, explanations are described hereinafter with respect to FIG. 2.

FIG. 2 is a block diagram illustrating a specific configuration of a display device according to an exemplary embodiment.

Referring to FIG. 2, a display device 100 according to the exemplary embodiment includes a broadcast receiver 110, a signal separator 120, an audio/video (A/V) processor 130, an audio output unit 140, a graphic user interface (GUI) generator 150, a display 160, a storage 170, an operating unit 180, a processor 190, and a communication interface 200.

The communication interface 200 and the display 160 of FIG. 2 are the same as the components illustrated in FIG. 1, which will not be redundantly explained below.

The broadcast receiver 110 receives a broadcast signal from a broadcasting station or satellite in a wired or wireless manner and modulates the broadcast signal.

The signal separator 120 may separate the broadcasting signal into a video signal, an audio signal, and an additional information signal. Further, the signal separator 120 may transmit the video signal and the audio signal to the A/V processor 130.

The A/V processor 130 processes an image signal transmitted from the broadcast receiver 110, the communication interface 200 and the storage 170, with respect to an audio signal, a signal processing such as a video decoding, a video scaling, an audio decoding, etc. is operated. The A/V processor 130 outputs an image signal to the GUI generator 150 and an audio signal to the audio output unit 140.

In the case of storing the received video and audio signals in the storage 170, the A/V processor 130 may compress the video and audio signals and store the compressed video and audio signals in the storage 170.

The audio output interface 140 may convert the audio signal that is output from the A/V processor 130 into sound, and may output the sound through a speaker (not illustrated) or to an external device connected thereto through an external output terminal (not illustrated).

The GUI generator 150 generates a Graphic User Interface (GUI) to provide to a user. The GUI generator 150 adds a generated GUI to an image output from the A/V processor 130. The GUI generator 150 provides the display 160 with an image to which the GUI is added.

The storage 170 may store video content. Specifically, the storage 170 may receive and store video content, in which video and audio are compressed, from the A/V processor 130, and may output the stored video content to the A/V processor 130 under the control of the processor 190. The storage 170 may be implemented as a hard disk, a nonvolatile memory, and/or a volatile memory.

The operating unit 180 is realized as a touch screen, a touch pad, a key button, a key pad, etc., and provides a user manipulation of the broadcast receiver. Such an operating unit 180 may be equipped with the display device 100, and receive a user manipulation from an external remote controller.

A processor 190 controls overall operations of the display device 100. Specifically, the processor 190, in response to an image signal being received from the communication interface 200, may control the display 160 to display the received image signal.

The processor 190 determines an operation state of the display device 100. Specifically, the processor 190 may determine that it is in a power-saving state if it is the state where displaying an image is unnecessary, and may determine that it is a normal state if it is the state where displaying an image is necessary.

In response to an image signal being input from the external device in the power-saving state, the processor 190 may determine that converting a state from the power-saving state to the normal state is necessary and control a state of the display device 100 to be a normal state. In the case that the state is converted from the power-saving state to the normal state, there may be various cases such as when a turn-on command is input from a user and when a predetermined time reaches in addition to when an image signal is input from the external device.

While the processor 190 displaying an received an image signal from the external device, if receiving the image signal from the external device is stopped and a predetermined period of time elapses, the processor 190 may determine that converting a state from a normal state to a power-saving state is necessary and control the display device 100 to be in the power-saving state.

As such, in the display device according to the exemplary embodiment, an operation state is automatically changed according to an input of an image signal from the external device, and thus, convenience is increased because a separate manipulation by a user is unnecessary.

In addition, the display device according to the exemplary embodiment, may determine whether there is an input of an image signal only with a simple filter circuit, and thus, a producing cost may be reduced.

Meanwhile, in describing with respect to FIG. 2, it is explained that displaying is possible by the display device 100 receiving a broadcast signal, but when it is realized, components such as the broadcast receiver and the signal separator necessary for receiving a broadcast signal may be omitted. In other words, the display device 100 may be a device such as a monitor which displays only an image transmitted from an external device in addition to a device such as a TV which displays a broadcast signal.

In addition, with reference to FIG. 2, it is described that the A/V processor and GUI generator are separate from the display but the A/V processor and the GUI generator may be realized with a video processor as a single component, or may be realized as an inner component of the display.

In addition, it is explained that the communication interface 200 is included in the display device 100 but a function of the communication interface 200 may be realized as a device which can be attached and detached from the display device. Hereinafter, a separate communication interface device which performs the same function to the communication interface 200 is explained with reference to FIG. 3.

Figure 3:
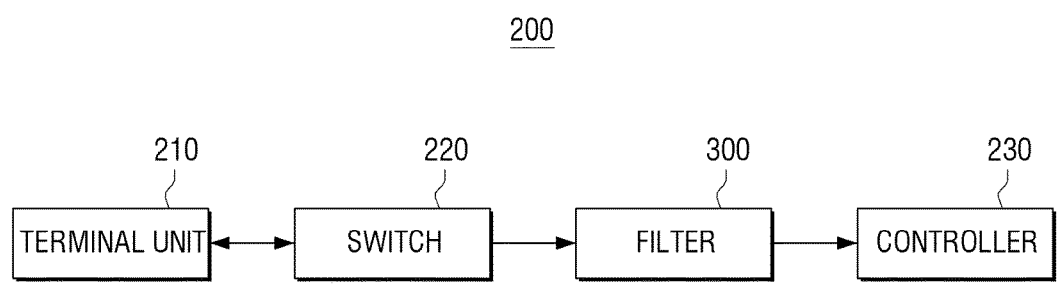
FIG. 3 is a block diagram illustrating a specific configuration of a communication interface illustrated in FIG. 1.

FIG. 3 is a block diagram illustrating a specific configuration of the communication interface illustrated in FIG. 1.

Referring to FIG. 3, the communication interface device 200 includes a terminal unit 210, a switch 220, a filter 300 and a controller 230.

The terminal unit includes a plurality of terminals in a housing to house a cable which connects an external device and the communication interface device 200 in a wired manner. Such a plurality of terminals are arranged to correspond to a plurality of terminals in a connector of the cable. Hereinafter, for an easy explanation, it is explained that the terminal unit 210 includes a plurality of terminals connected to an HDMI cable, but it may be a terminal which is connected to a connector of another cable such as an USB, an HML in addition to the HDMI cable which transmits a differential signal.

The terminal unit 210 includes a plurality of terminal to be connected with 19 terminals of the HDMI cable, and eight (TMDS data 1+, TMDS data 1−, TMDS data 2+, TMDS data 2−, TMDS data 0+, TMDS data 0−, TMDS Clock+, TMDS Clock−) of the plurality of terminals receive a differential signal.

The switch 220 selectively connects the plurality of terminals of the terminal unit 210 to the filter 300 or a video processor (specifically, the above described display 160 or the A/V processor 130). Specifically, the switch 220 operates the switching operation with respect to all differential signals received from the external device or operates the switching operation with respect to only a single differential signal among differential signals received from the external device. Hereinafter, for an easy explanation, it is explained that only a clock negative signal is switched among HDMI terminals, but two of the clock signals may be switched and another differential signal may be switched in addition to a clock signal.

The filter 300 averages an output value of a terminal by using a low pass filter and outputs the value. Specifically, the filter 300 may include a single low pass filter or a plurality of low pass filters.

Specifically, as illustrated in FIG. 9A, if average terminal voltage in a section where a clock signal is input is different from average terminal voltage in a section where a clock signal is input, it may be realized only with a single low pass filter. Specifically, it is because an output value to the low pass filter is changed according to whether a clock signal is present as illustrated in FIG. 9B.

As illustrated in FIG. 10A, if average terminal voltage in a section to which a clock signal is input is the same to the average terminal voltage of a section to which a clock signal is input, it can be constituted with two low pass filter. Specifically, as illustrated in FIG. 10B, the clock signal as illustrated in FIG. 10A is not changed according to whether a value output to a low pass filter is present in the clock signal. Therefore, in such a case, it is realized with the two filters—a low pass filter which outputs a maximum value of a signal and a low pass filter which outputs a minimum value of a signal.

Meanwhile, with respect to the case of the filter 300 being realized in one low pass filter, an operation of the filter 300 is described hereinafter with reference to FIG. 4. With respect to the case of the filter 300 being realized in two low pass filters, an operation of the filter 300 is described hereinafter with reference to FIG. 5.

The controller 230 determines whether a differential signal (or an image signal) is input from an external device based on an output value of the filter 300. Specifically, if the filter 300 is realized with a low pass filter, the controller 230 may determine whether a differential signal is input from the external device in response to an output value being changed based on a change of the output value of the filter 300. If the filter 300 is realized with two low pass filters, the controller 230 may determine that a differential signal is input in response to value of the two low pass filters being different.

The controller 230 controls all components in the communication interface device 200. Specifically, in response to determining that a differential signal is input, the controller 230 may control the switch 220 so that the differential signal received from the external device to be transmitted to a video processor or a display. In addition, if the display device 100 is in a power-saving state, in response to determining that a differential signal is input from the external device, the controller 230 may change an operation state of the display device 100 by transmitting information regarding the differential signal input to the processor 190.

The communication interface device according to the exemplary embodiment can detect a change of a differential signal only with a relatively simple low pass filter circuit, and thus, producing cost may be reduced and a size of a communication circuit may be minimized.

Figure 4:
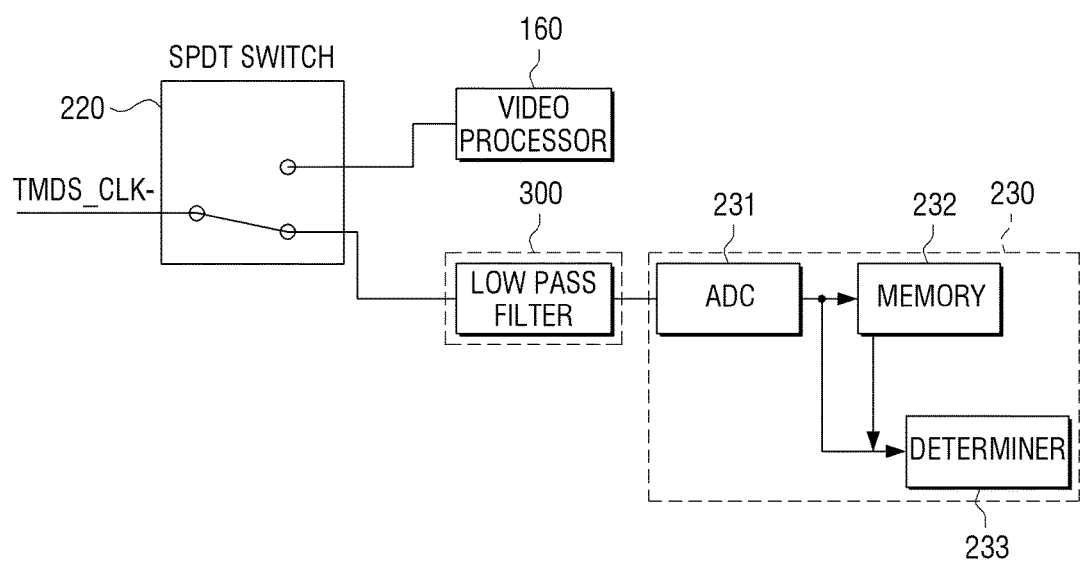
FIG. 4 is a block diagram illustrating a configuration of a communication interface according to a first exemplary embodiment.
Figure 9:
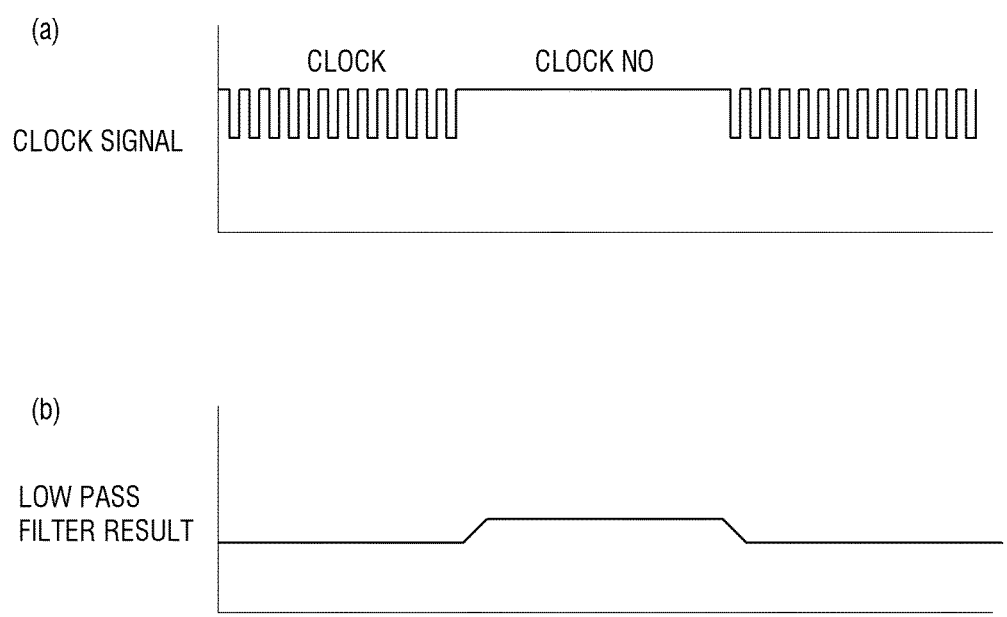
FIG. 9 is an output waveform diagram of a clock signal of a first form and a low pass filter according thereto.

FIG. 4 is a block diagram illustrating a communication interface according to a first exemplary embodiment. Specifically, FIG. 4 is a block diagram illustrating a constitution of the case that a clock differential signal as illustrated in FIG. 9 is used.

Referring to FIG. 4, the switch 220 may be connected to a terminal in which an input terminal receives a negative differential signal (TMDS CLK−) and each of the output terminals may be constituted as a Single Pole, Double Throw (SPDT) switch which is respectively connected to the display 160 and the filter 300. Specifically, the switch 220 may transmit the negative clock differential signal (TMDS CLK−) selectively to the filter 300 or the display 160.

The filter 300 includes a low pass filter, and averages a signal output from a terminal by which the negative clock differential signal is input and transmits the signal to an input port of the controller 230. Therefore, as illustrated in FIG. 9B, in a section where a clock signal is not input, a value which is higher than a value in a section where a clock signal is input may be output.

The controller 230 includes an ADC 231, a memory 232, and determiner 233. Specifically, the controller is a chip which can input an analogue signal, and an output of the above described filter 300 may be connected to an input port which receives an input of the analogue signal.

The ADC 231 changes an output value of the filter 300 to a digital value.

The memory 232 stores a pre-set reference value. When it is realized, the memory 232 may store a previous value of the value output from the ADC 231.

The determiner 233 may compare the digital value of the ADC 231 with the reference value in the memory 232 or with the previous digital value, and in response to the two values being the same, the determiner 233 may determine that a differential signal is not input, and in response to there being a difference between the two values, may determine that a differential signal is input. It is described that whether a differential signal is input is determined according to whether the two values are the same, but it may be determined that a differential signal is input only when the output value of the ADC unit 231 and the value of the memory 232 differ by a predetermined value or more by the memory 232 having a margin with respect to a value.

Figure 5:
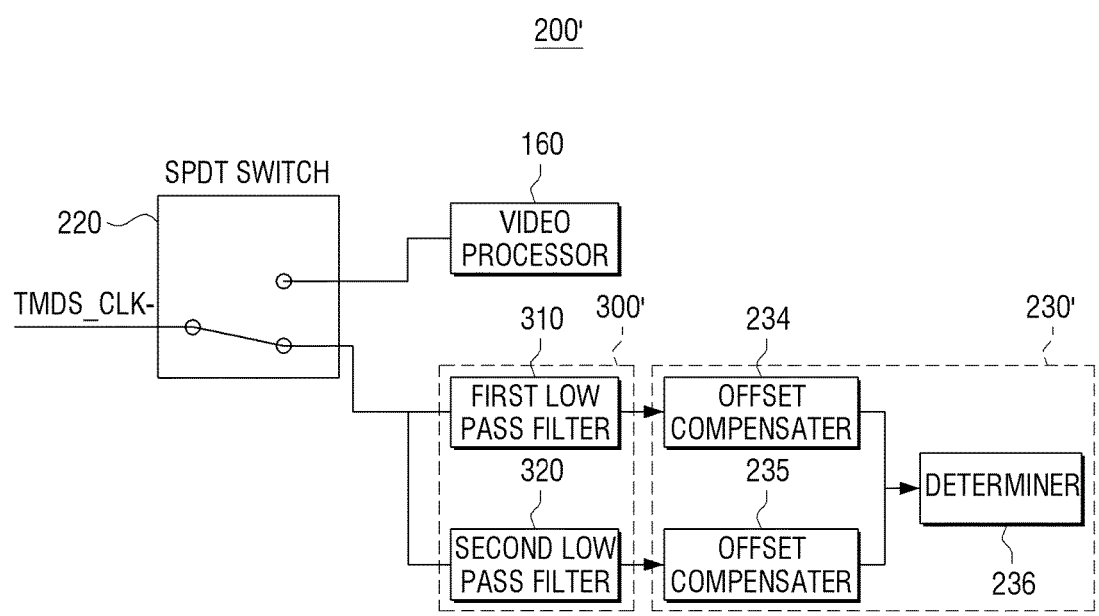
FIG. 5 is a block diagram illustrating a configuration of a communication interface according to a second exemplary embodiment.
Figure 6:
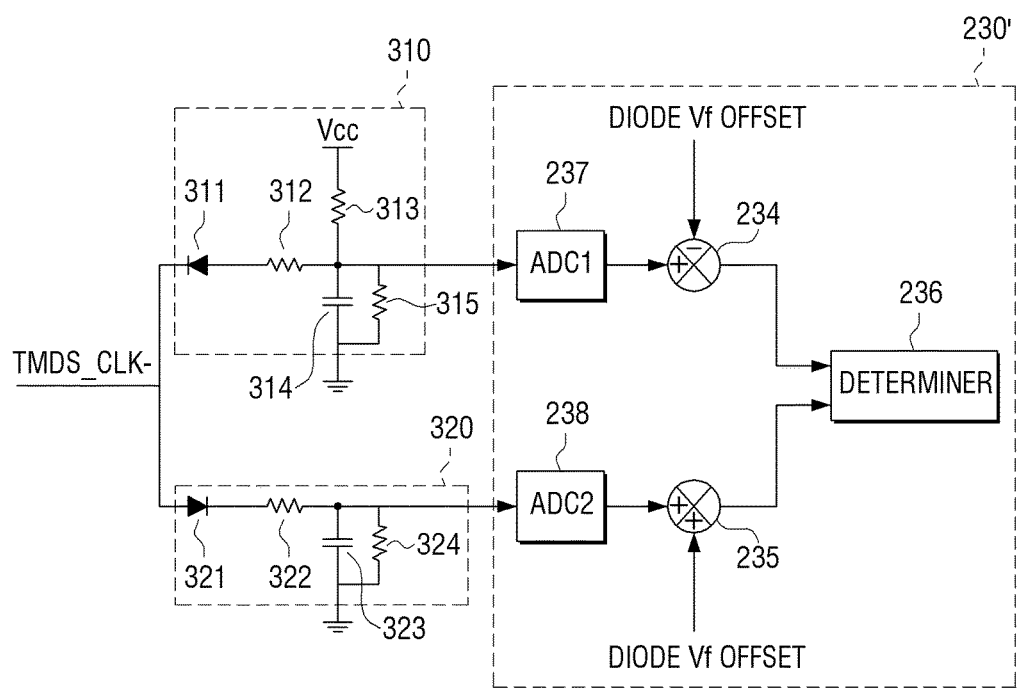
FIG. 6 is a circuit diagram of a communication interface according to a second exemplary embodiment.
Figure 10:
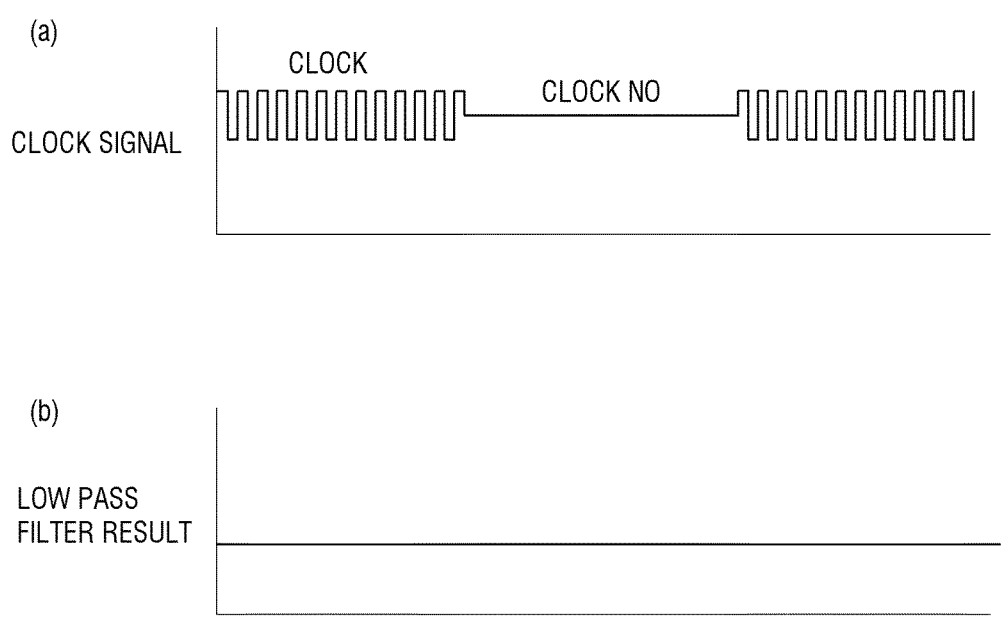
FIG. 10 is a waveform of a clock signal of a second form and a low pass filter output according thereto.

FIG. 5 is a block diagram illustrating a configuration of a communication interface according to a second exemplary embodiment. FIG. 6 is a circuit diagram of a communication interface according to the second exemplary embodiment. Specifically, FIG. 5 is the block diagram illustrating a configuration of the case that the clock differential signal as illustrated in FIG. 10 is used. Meanwhile, FIG. 5 is applicable even in the case of using the clock differential signal as illustrated in FIG. 9.

Referring to FIGS. 5 and 6, an input end of the switch 220 is connected to a terminal which receives a negative clock signal (TMDS CLK−), and two output ends are respectively connected to the display 160 and the filter 300. Specifically, according to a control of a controller 230', the switch 220 may transmit the negative clock differential signal (TMDS CLK−) selectively to the filter 300 or to the display 160.

The filter 300 includes a first low pass filter 310 and a second low pass filter 320.

The first low pass filter 310 outputs a maximum voltage value of a signal transmitted from the switch 220. Specifically, the first low pass filter 310 includes a first diode 311, a first resistance 312, a second resistance 323, a first capacitor 314 and a third resistance 315.

The first diode 311 is connected to a terminal in which a cathode receives a negative clock differential signal (TMDS CLK−) through the switch, and an anode is connected to a first end of the first resistance 312.

In the first resistance 312, a first end is connected to the anode of the first diode 311, and a second end is commonly connected to a second end of the second resistance 313, a first end of the first capacitor 314 and a first end of the third resistance 315. The second end of the first resistance 312 may be connected to a first input port of the controller 230' as an output node of the first low pass filter 310.

A first end of the second resistance 313 receives pre-set voltage, and the second end is commonly connected to the second end of the first resistance 312, the first end of the first capacitor 314, the first end of the third resistance 315 and the first input port of the controller 230'.

The first end of the first capacitor 314 is commonly connected to the second end of the first resistance 312, the second end of the second resistance 313, the first end of the third resistance 315 and the first input port of the controller 230', and a second end of the first capacitor 314 is earthed.

The third resistance 315 is connected to the first capacitor 314 in parallel. Specifically, the first end of the third resistance 315 is commonly connected to the second end of the first resistance 312, the second end of the second resistance 313, the first end of the first capacitor 314 and the first input port of the controller 230', and a second end of the third resistance 315 is earthed.

The second low pass filter 320 outputs a minimum voltage value of a signal transmitted from the switch 220. Specifically, the second low pass filter 320 includes a second diode 321, a fourth resistance 322, a second capacitor 323, and a fifth resistance 324.

In the second diode 321, an anode is connected to a terminal which receives an input of a negative clock differential signal (TMDS CLK−) through the switch 220 and a cathode is connected to a first end of the fourth resistance 322.

The first end of the fourth resistance 322 is connected to the cathode of the second diode 321 and a second end of the fourth resistance 322 is commonly connected to a first end of the second capacitor 323 and a first end of the fifth resistance 315. The second end of the fourth resistance 322 may be connected to a second input port of the controller 230' through an output node of the second low pass filter 320.

The first end of the second capacitor 323 is commonly connected to the second end of the fourth resistance 322, the first end of the fifth resistance 324 and the second input port of the controller 230', and a second end of the second capacitor 323 is earthed.

The fifth resistance 324 is connected to the second capacitor 323. Specifically, the fifth resistance 324 is commonly connected to the second end of the fourth resistance 322, the first end of the second capacitor 323 and the second input port of the controller 230', and a second end of the fifth resistance 324 is earthed.

The controller 230' includes a first offset compensator 234, a second offset compensator 235 and a determiner 236.

The first offset compensator 234 outputs a digital value which is obtained by subtracting a pre-set diode offset value from an output value of the first low pass filter 310. Specifically, the first offset compensator 234 includes a first ADC 237 and the diode offset 234.

The first ADC 237 changes the output value of the first low pass filter 310 to a digital value.

The diode offset 234 may subtract a diode offset value (approximately 0.7) from the digital value of the first ADC 237.

The second offset compensator 235 outputs a digital value which is obtained by adding a pre-set diode offset value to an output value of the second low pass filter 230. Specifically, the second offset compensator 235 includes a second ADC 238 and the diode offset 235.

The second ADC 238 changes the output value of the second low pass filter 320 to a digital value.

The diode offset 235 may add a diode offset value (approximately 0.7) to a digital value of the second ADC 238.

The determiner 233 may compare a digital value of the first offset compensator 234 with a digital value of the second offset compensator 235, in response to the two values being the same, determine that a differential signal is not input, and in response to there being a difference between the two values, determine that a differential signal is input. It is described that whether a differential signal is input is determined based on whether the two values are the same or not, but when it is embodied, a margin between the two values may be made and only when the two values are different more than the margin, it is determined that a differential signal is input.

Hereinabove, a circuit in which the controller 230' compensates a diode offset which is generated because the direction of the diodes respectively included in the first low pass filter and the second low pass filter are opposite, but when it is embodied, a voltage drop by a diode in a low pass filter may be compensated through an additional diode. This will be described hereinafter with reference to FIG. 7.

Figure 7:
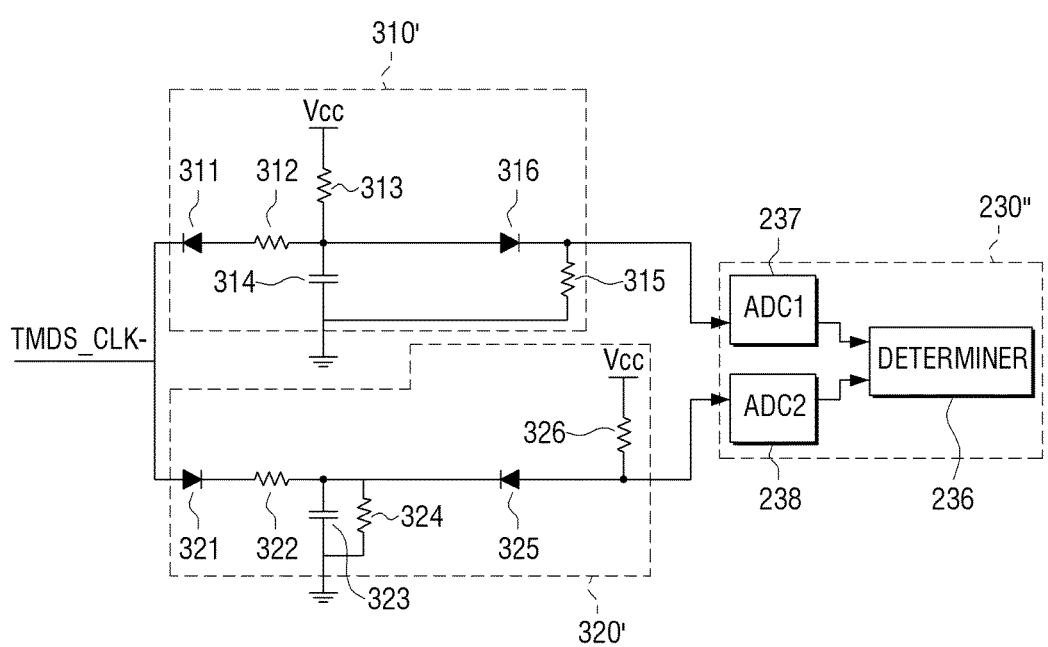
FIG. 7 is a circuit diagram of another communication interface according to a third exemplary embodiment.

FIG. 7 is a circuit of another communication interface according to a third exemplary embodiment.

Referring to FIG. 7, a filter 300' includes a first low pass filter 310' and a second low pass filter 320'.

The first low pass filter 310' outputs a maximum voltage value of a signal transmitted from the switch 220. Specifically, the first low pass filter 310' includes the first diode 311, the first resistance 312, the second resistance 313, the first capacitor 314, the third resistance 315 and a third diode 316.

In the first diode 311, a cathode is connected to a terminal which receives a negative clock differential signal (TMDS CLK−) through the switch 220, and an anode is connected to the first resistance 312.

A first end of the first resistance is connected to the anode of the first diode 311, and a second end of the first resistance is commonly connected to a second end of the second resistance, a first end of the first capacitor 314 and an anode of the third diode 316.

A first end of the second resistance 313 receives an input of pre-set voltage, and a second end of the second resistance 313 is commonly connected to the second end of the first resistance 312, the first end of the first capacitor 314 and the anode of the third diode 316.

The first end of the first capacitor 314 is commonly connected to the second end of the first resistance 312, the second end of the second resistance 313 and the anode of the third diode 316, and a second end of the first capacitor 314 is earthed.

A first end of the third resistance 315 is commonly connected to a cathode of the third diode 316 and a first input port of a controller 230", and a second end of the third resistance 315 is earthed.

The anode of the third diode 316 is commonly connected to the second end of the first resistance 312, the second end of the second resistance 313 and the first end of the first capacitor 314, and the cathode of the third diode 316 is commonly connected to the first end of the third resistance 315 and the first input port of the controller 230".

The second low pass filter 320'outputs a minimum voltage value of a signal transmitted from the switch 220. Specifically, the second low pass filter 320' includes the second diode 321, the fourth resistance 322, the second capacitor 323, the fifth resistance 324, a fourth diode 325 and a sixth resistance 326.

An anode of the second diode 321 is connected to a terminal which receives a negative clock differential signal (TMDS CLK−) through the switch 220, and a cathode of the second diode 321 is connected to a first end of the fourth resistance 322.

The first end of the fourth resistance 322 is connected to a cathode of the second diode 321, a second end of the fourth resistance 322 is commonly connected to a first end of the second capacitor 323, a first end of the fifth resistance 315 and a cathode of the fourth diode 325.

The first end of the second capacitor 323 is commonly connected to a second end of the fourth resistance 322, a first end of the fifth resistance 324 and the cathode of the fourth diode 325, and a second end of the second capacitor 323 is earthed.

The fifth resistance 324 is connected to the second capacitor 323 in parallel. The first end of the fifth resistance 324 is commonly connected to the second end of the fourth resistance 322, the first end of the second capacitor 323 and the cathode of the fourth diode 325, and a second end of the fifth resistance 324 is earthed.

The cathode of the fourth diode 325 is commonly connected to the second end of the fourth resistance 322, the first end of the second capacitor 323 and the first end of the fifth resistance 324, and an anode of the fourth diode 325 is commonly connected to a second end of the sixth resistance 326 and a second input port of the controller 230".

A first end of the sixth resistance 326 receives an input of pre-set voltage, and a second end of the sixth resistance 326 is commonly connected to the anode of the fourth diode 325 and the second input port of the controller 230".

The controller 230' includes the first ADC, the second ADC 238 and the determiner 236.

The first ADC 237 changes an output value of the first low pass filter 310' to a digital value.

The second ADC 238 changes an output value of the second low pass filter 320' to a digital value.

The determiner 236 may compare the digital value of the first ADC 237 with the digital value of the second ADC 238, in response to the two values being the same, determine that a differential signal is not input, and in response to there being a difference between the two values, determine that a differential signal is input. It is described that whether a differential signal is input based on whether there is a difference between the two values, but when it is embodied, a margin between the two values may be made and only when the two values are different more than the margin, it is determined that a differential signal is input.

With reference to FIGS. 5 to 7, it is illustrated and described that two low pass filters are connected to a common terminal, but each of the two low pass filters may be connected to different terminals. For example, a first low pass filter may be connected to a terminal which receives a positive clock signal, and a second low pass filter may be connected to a terminal which receives a negative clock signal.

Figure 8:
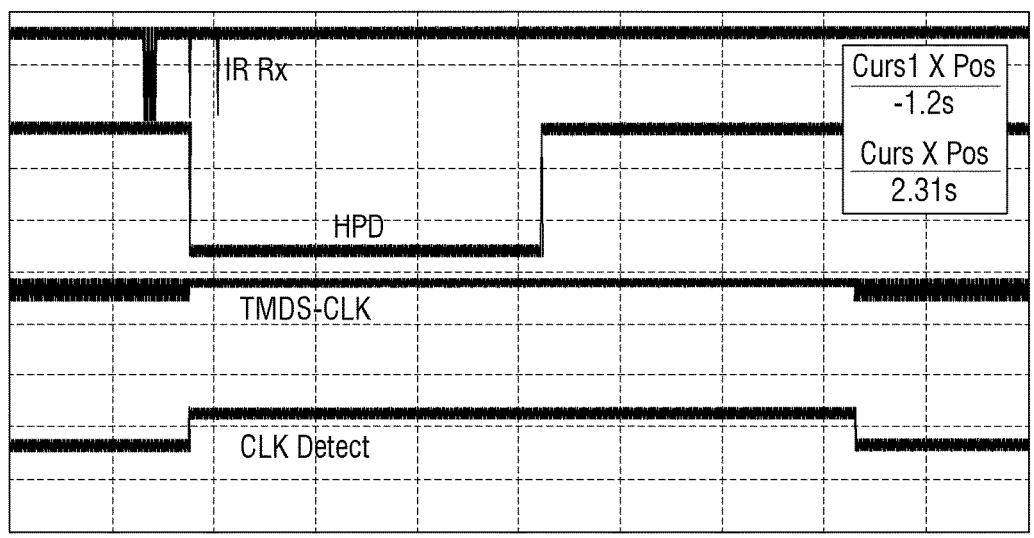
FIG. 8 is a waveform diagram of an input terminal and a low pass filter according to the second exemplary embodiment.

FIG. 8 is a waveform diagram of an input terminal and a low pass filter according to the second exemplary embodiment.

Referring to FIG. 8, it can be checked that according to a change of a negative clock differential signal (TMDS−CLK), a low pass filter (CLK Detect) outputs a different value.

Figure 11:
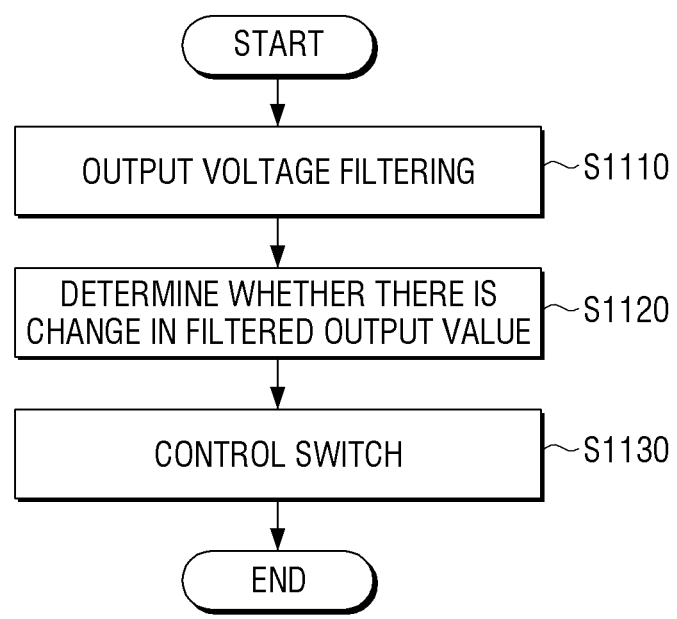
FIG. 11 is a flowchart illustrating an image signal detecting method according to an exemplary embodiment.

FIG. 11 is a flowchart illustrating a video signal detecting method according to an exemplary embodiment.

Referring to FIG. 11, an output value of one of a plurality of terminals which receive a differential signal is filtered (S1110). Specifically, a negative clock terminal of an HDMI may be filtered by using a low pass filter.

Whether there is a change in a filtered output value is determined (S1120). Specifically, by determining whether a filtered output value is changed, whether a differential signal is input from an external device is determined. For example, as illustrated in FIG. 8, in response to an output value being changed from a high value to a low value, it can be checked that a differential clock signal is being input, and because the differential clock signal is a signal transmitted together when an image signal is transmitted, it can be determined that an image signal is being input.

If it is determined that a differential signal is input, a switch may be controlled so that a differential signal to be transmitted to a display (S1130). Herein, if it is determined that the display device 100 is in a power-saving state, an operation state of the display device 100 may be converted to a normal state.

Therefore, in the image signal detecting method according to the exemplary embodiment, whether an image signal is input can be determined by using a relatively simple low pass filter circuit, and thus, a communication device can be minimized and cost also can be reduced. The image signal detecting method illustrated in FIG. 11 may be executed in a display device having the configurations illustrated in FIG. 1 or FIG. 2, in a communication interface device having the configuration illustrated in FIG. 3, or in a display device or a communication interface device having a different configuration.

In addition, the above-described video signal detecting method may be realized as at least one execution program to execute the above-described video signal detecting method, and such an execution program may be stored in a non-transient computer-readable recording medium.

Therefore, each block according to an exemplary embodiment may be implemented as a computer-recordable code on the non-transitory computer readable recording medium. The non-transitory computer readable recording medium may be a device to store the data that can be read by a computer system.

While the general concept has been shown and described with reference to certain embodiments thereof, it will be understood by those skilled in the art that various changes in form and detail may be made therein without departing from the spirit and principles of the present general concept, the scope of which is defined by the appended claims and their equivalents.

What is claimed is:

1. A communication interface device, comprising:
    a single input terminal;
    a signal filter including a low pass filter connected to the single input terminal and configured to filter a signal input by the single input terminal from an external device;
    a switch; and
    a controller configured to identify whether the signal input from the external device is a differential signal based on a change of an output value of the low pass filter,
    wherein the controller is further configured to:
    identify whether the signal input from the external device is the differential signal by comparing a reference value and the output value of the low pass filter,
    based on identifying that the signal input from the external device is the differential signal while a display is in a normal status, control the switch to connect the single input terminal to at least one of a video processor or the display, and
    based on identifying that the signal input from the external device is the differential signal while the display is in a power-saving status, transmit a signal for changing the power-saving status to the normal status to a processor of the display.

2. The communication interface device as claimed in claim 1, wherein the signal filter includes:
    a first low pass filter configured to output a maximum voltage value of the terminal; and
    a second low pass filter configured to output a minimum voltage value of the terminal.

3. The communication interface device as claimed in claim 2, wherein the controller identifies whether the differential signal is input from the external device by comparing a first output value of the first low pass filter and a second output value of the second low pass filter.

4. The communication interface device as claimed in claim 2, wherein the first low pass filter includes:
    a first diode in which a first diode cathode is connected to the terminal;
    a first resistance in which a first resistance first end is connected to a first diode anode and a first resistance second end is connected to a first input port of the controller;
    a second resistance in which a second resistance first end receives an input of a pre-set voltage and a second resistance second end is commonly connected to the second end of the first resistance and the first input port;
    a first capacitor in which a first capacitor first end is commonly connected to the second end of the first resistance, the second end of the second resistance and the first input port, and a first capacitor second end is grounded; and
    a third resistance which is connected to the first capacitor in parallel, and
    wherein the second low pass filter includes:
    a second diode in which a second diode anode is connected to the terminal;
    a fourth resistance in which a fourth resistance first end is connected to the first diode cathode and a fourth resistance second end is connected to a second input port of the controller;
    a second capacitor in which a second capacitor first end is commonly connected to the fourth resistance second end and to the second input port, and a second capacitor second end is grounded; and
    a fifth resistance which is connected to the second capacitor in parallel.

5. The communication interface device as claimed in claim 4, wherein the controller changes a value input to the first input port to a first digital value, changes a value input to the second input port to a second digital value, subtracts an offset value from the first digital value, adds the offset value to the second digital value and identifies whether the differential signal is input from the external device by comparing the first digital value and the second digital value.

6. The communication interface device as claimed in claim 2, wherein the first low pass filter includes:
    a first diode in which a first diode cathode is connected to the one of the plurality terminals;
    a first resistance in which a first resistance first end is connected to an anode of the first diode and having a first resistance second end;
    a second resistance in which a second resistance first end receives an input of a pre-set voltage and a second resistance second end is connected to the first resistance second end;
    a first capacitor in which a first end is commonly connected to the first resistance second end and the second end of the second resistance, and a second end is earthed;
    a third diode in which a cathode is commonly connected to the first resistance second end, the second resistance second end and the first capacitor first end, and an anode is connected to a first input port of the controller; and
    a third resistance in which a third resistance first end is commonly connected to the anode of the third diode and the first input port, and a second end is grounded, and
    wherein the second low pass filter includes:
    a second diode in which the anode is connected to the terminal;
    a fourth resistance in which a fourth resistance first end is connected to a cathode of the second diode;
    a second capacitor in which a second capacitor first end is connected to the fourth resistance second end, and a second capacitor second end is grounded;
    a fifth resistance which is connected to the second capacitor in parallel;
    a fourth diode in which a fourth diode cathode is commonly connected to the fourth resistance second end, the second capacitor first end and a fifth resistance first end, and a fourth diode anode is connected to a second input port of the controller; and
    a sixth resistance in which a sixth resistance first end receives the pre-set voltage, and a sixth resistance second end is commonly connected to the fourth diode anode and the second input port.

7. The communication interface device as claimed in claim 6, wherein the controller changes a value input to the first input port to a first digital value, changes a value input to the second input port to a second digital value, and identifies whether the differential signal is input from the external device by comparing the first digital value and the second digital value.

8. The communication interface device as claimed in claim 1, wherein the low pass filter is connected to any one of two terminals to which a clock signal is input.

9. The communication interface device as claimed in claim 1, wherein the terminal is compatible with a High Definition Multimedia Interface (HDMI) connector.

10. A display device, comprising:
a communication interface configured to receive an image signal via a single input terminal from an external device;
a display; and
a processor configured to control the display to display an image corresponding to the received image signal,
wherein the communication interface is further configured to:
based on a change of a single image signal output value of a low pass filter connected to the single input terminal which receives the image signal, identify whether the image signal received via the single input terminal from the external device is a differential signal by comparing a reference value and the output value of the low pass filter,
based on identifying that the image signal received via the single input terminal from the external device is the differential signal while the display device is in a normal status, control a switch to connect the single input terminal to at least one of the processor or the display, and
based on identifying that the image signal received via the single input terminal from the external device is the differential signal while the display device is in a power-saving status, transmit a signal for changing the power-saving status to the normal status to the processor.

11. The display device as claimed in claim 10, wherein the filter includes:
a first low pass filter configured to output a maximum voltage value of the terminal; and
a second low pass filter configured to output a minimum voltage value of the terminal.

12. The display device as claimed in claim 11, wherein the communication interface identifies whether the image signal is input from the external device by comparing a first output value of the first low pass filter and a second output value of the second low pass filter.

13. The display device as claimed in claim 10, wherein the low pass filter is connected to any one of two terminals to which a clock signal is input.

14. The display device as claimed in claim 10, wherein the terminal is compatible with an HDMI connector.

15. The display device as claimed in claim 10, wherein the communication interface includes:
a terminal configured to receive the differential signal from the external device;
a signal filter configured to include the low pass filter connected to the terminal; and
a controller configured to identify whether the image signal is input from the external device based on the change of the output value of the low pass filter.

* * * * *